United States Patent [19]

Obidniak

[11] 4,049,550

[45] Sept. 20, 1977

[54] WATER FILTRATION MODULE

[76] Inventor: Louis Obidniak, 3115 Ramezay St., Ville de Laval, Quebec, Canada

[21] Appl. No.: 720,349

[22] Filed: Sept. 3, 1976

[51] Int. Cl.² .......................................... B01D 35/02
[52] U.S. Cl. .................................. 210/152; 210/244; 210/433 M
[58] Field of Search ............... 210/64, 152, 244, 241, 210/251, 449, 282; 55/279; 73/421 R, 421.5 A, 23, 17 A

[56] References Cited

U.S. PATENT DOCUMENTS

| 3,498,457 | 3/1970 | Gough | 210/244 |
| 3,856,676 | 12/1974 | Grimme, Jr. et al. | 210/152 X |
| 3,903,745 | 9/1975 | Bolser | 73/421.5 A |

Primary Examiner—Frank A. Spear, Jr.
Assistant Examiner—E. Rollins Cross
Attorney, Agent, or Firm—Larson, Taylor and Hinds

[57] ABSTRACT

A water filtration unit for use in locations close to a pressurized source of raw water, the unit including a molded plastic base and cover and containing a water filtering module and a raw water tap connection and hose connection between the tap connection and the filtering module and a hose connection from the filtering module and a vessel to be filled with filtered water. The hose connections are secured to the base of the unit and the tap connection rests in a sterilizing tank filled with water in which a sterilizing fluid such as liquid chlorine, (domestic bleach) or the like are included. The tank is filled in the base of the unit to prevent the passage of air to the filtering module, and bacteria contamination of the connections when not in use. The base of the unit has means for ready mounting and the cover is hinge-mounted on the base on one vertical side or the other, depending on the location and access to the unit. The filtering module has an upper capped inlet whereby cleaning and testing compounds can be inserted and a drain from the filtering module which attaches to a tap and includes a needle valve which is adjustable to control the flow through the drain. The flow of filtered water and the flow of water through the drain are approximately the same.

11 Claims, 6 Drawing Figures

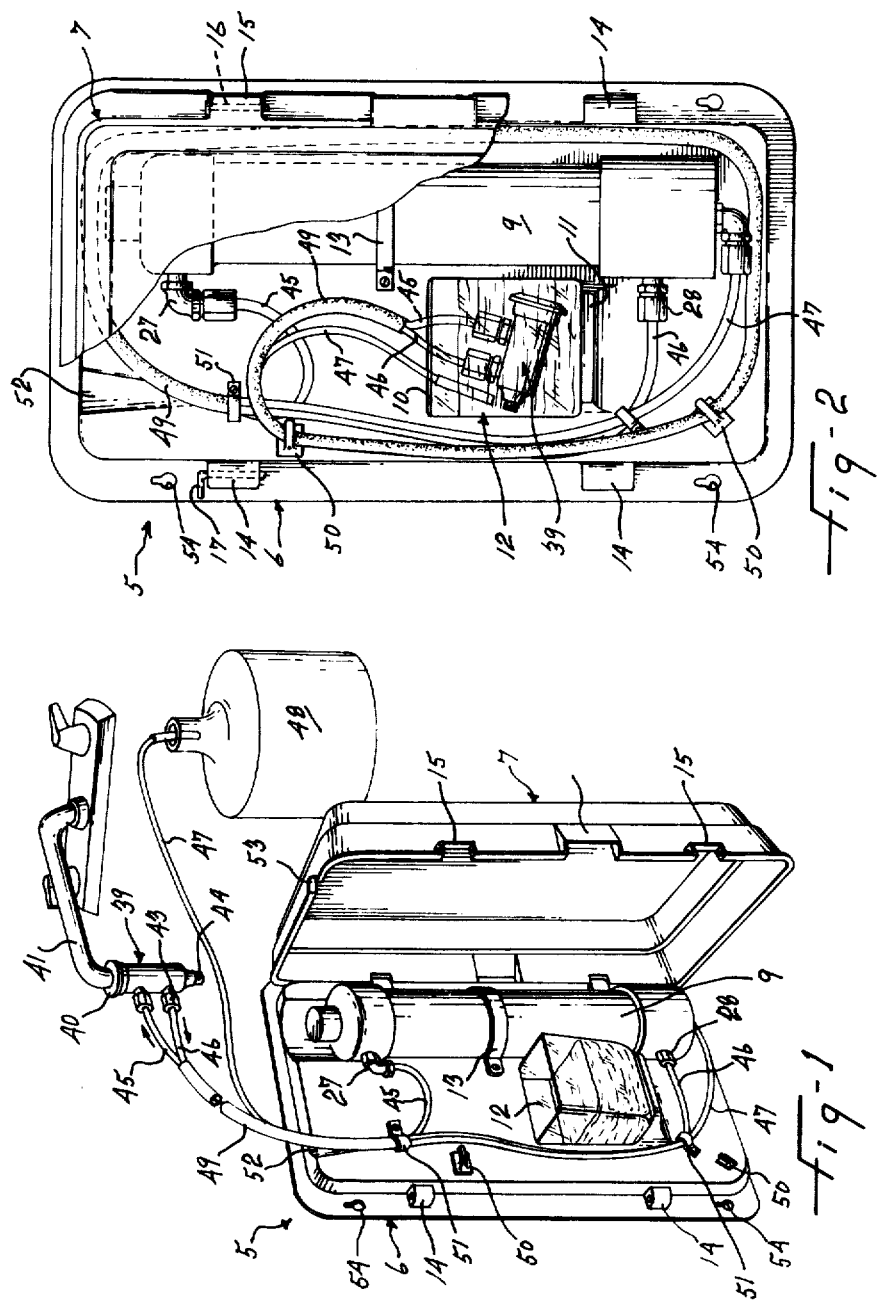

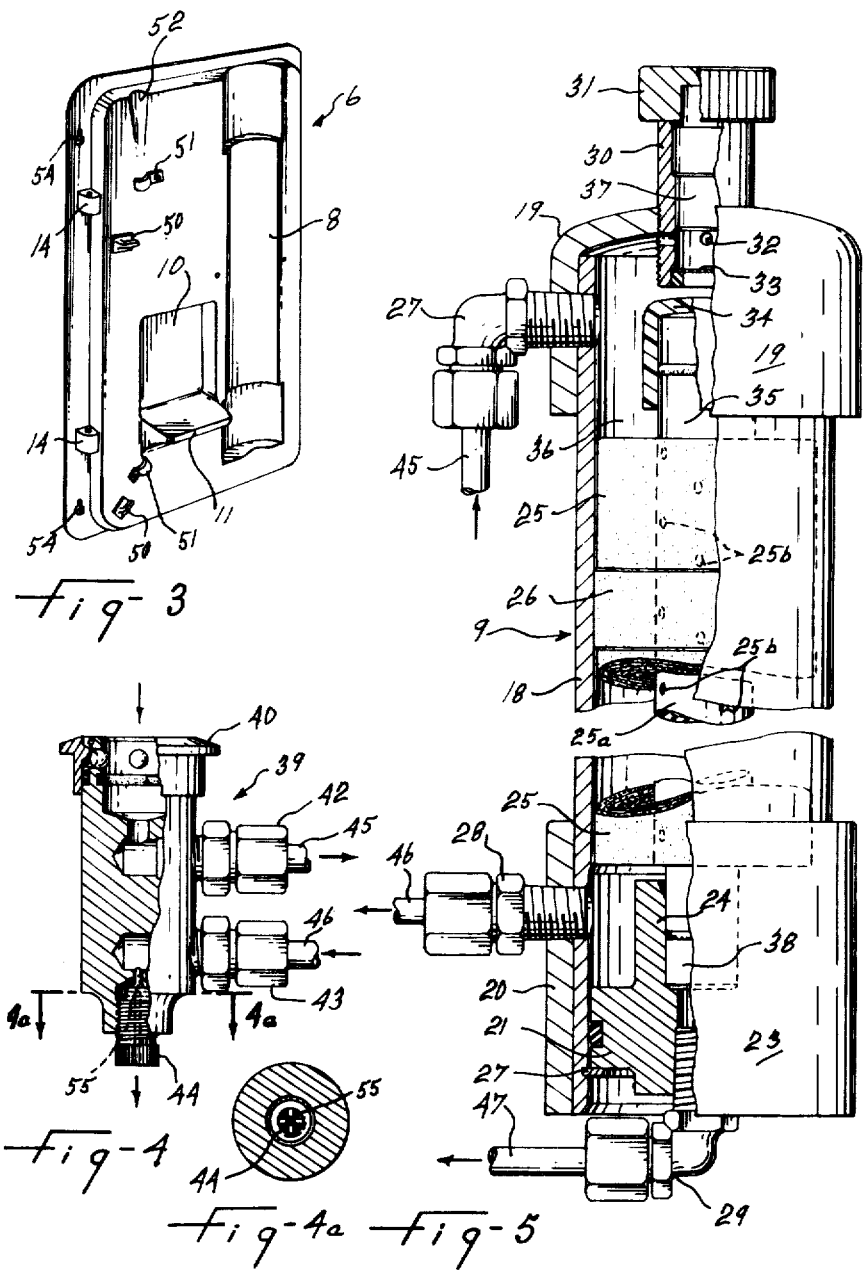

WATER FILTRATION MODULE

This invention relates to a water filter unit particularly adapted for filtration of small quantities of raw water as required in homes and the like.

Water filtration systems are well known mainly for the filtration of relatively large quantities of raw water. However, a need has developed for the efficient filtration of small quantities of raw water in homes, etc., in isolated locations where the water supply is not passed through filtration plants or where the water supply has become contaminated. Also there is a growing need for the filtration of water for special purposes such as in laboratories, etc.

The present invention consists essentially of a compact unit suitable for mounting on the back of a cupboard door adjacent to a raw water tap. The unit includes a molded rigid plastic base and hinged cover within which is mounted a filter module containing ultra-filtration or reverse osmosis membrane, a sterilization tank fitted to the base of the unit, and a quick water tap connector for attachment to the raw water tap which is generally equipped with a special adaptor to connect and release the connector. One flexible hose from the quick water tap connector supplies raw water to the top of the filter module and a second flexible hose connects the drain from the bottom of the filter back to the quick water tap connector, while a third flexible hose carries the filtered water from the bottom of the filter module for delivery of purified water as required. All three flexible hoses are contained within a flexible sleeve which is clipped to the base of the unit when the unit is not in service. The quick water tap connector at its base is provided with a needle valve which can be adjusted so that the flow through the drain from the filter module and the flow of filtered water is approximately the same, the adjustment being necessary for different pressures and different flows from the raw water tap. A cover for the base of the unit is preferably hinged to both sides of the base of the unit to facilitate opening of the cover to one side or the other, depending on the location of the unit. The cover is also provided with an aperture at the top for the sleeve containing all three flexible hoses to pass through with the cover remaining closed while the apparatus is in use.

When the apparatus is not in use, the quick water tap connector is lowered into the sterilization tank whereby air is kept from entering the filter unit thus preventing drying out of the filter element and bacteria contamination.

Access to the top of the filter unit is provided whereby the filter element can be cleaned and tested by: (a) inserting an acid to remove mineral salts; (b) inserting a detergent to remove fatty substances; (c) inserting liquid chlorine or other bacteriological cleaning compounds; and (d) inserting an organic dye for testing of the ultra-filtration membrane.

The primary object of the invention is to provide a small and compact filter unit for the purification of raw water, particularly useful where small quantities of pure water are required, such as in homes or laboratories.

A further object of the invention is to provide a filter unit which can be readily attached to a raw water tap and in which the tap attachment is contained in a sterilized water container when not in use, thus sealing the filter element against drying out and bacteria contamination.

A further object of the invention is to provide a filter module which is self-cleaning while in normal use, thus ensuring a longer and more efficient life.

A further object of the invention is to provide a filter module which is easily serviced and tested while in place.

These and other objects of the invention will be apparent from the following specification and drawings in which:

FIG. 1 is a perspective view of the filter unit with the cover open and connected in the operative position to a source of water supply and to a filtered water receiver.

FIG. 2 is a front elevation of the filter unit in the inoperative position with the cover cut away to show the hose connections in the stored position.

FIG. 3 is a front perspective view of the base of the unit.

FIG. 4 is a view of the water tap connector partly in section.

FIG. 4a is a transverse section taken on the line 4a—4a of FIG. 4.

FIG. 5 is an elevational view of the filter module partly in section.

Referring to the drawings, the water filter unit 5 consists of a base member 6 and a cover member 7, both base and cover members being preferably molded from rigid plastic.

The base member 6 has a vertically disposed molded recess 8 to receive the water filter module 9 and a molded recess 10 and outwardly projecting platform 11 at its lower edge to receive a sterilization tank 12. The water filter unit 9 is secured in place by the clamp 13, while the sterilization tank 12 is secured in place by friction contact within the recess 10 and on the platform 11.

The base member 6 has a pair of hinge blocks 14 on each vertical edge and the cover member 7 has a pair of matching hinge blocks 15 on each vertical edge. Hinge pins 16 connect the cover 7 to the base 6 on whichever side of module 5 it is desired that the cover be hinged, and locking pins 17 secure the opposite side of the cover to the base.

The filter module 9 is shown in detail in FIG. 5 and consists of a tabular casing 18 having a top end cap 19 and a bottom end sleeve 20. A bottom end fitting 21 is secured in place by the retaining ring 22 and an O-ring 23 prevents leakage of fluid past the fitting 21 and the casing 18.

Fitted within the casing 18 between the top end cap 19 and the upwardly extending portion 24 of the bottom end fitting 21 is the filter membrane 25 spirally wound ultrafiltration membrane has a hollow mandrel 25a and is provided with a series of slots or apertures 25b to permit the flow of filtered water down through the mandrel 25a to the bottom end fitting 21. A soft rubber sleeve 26 about the outer surface of the filter membrane 25 prevents leakages of fluid downwards between the membrane 25 and the inner surface of the casing 18.

The filter membrane 25 may be of the reverse osmosis type, such as type SEPA-50 or of the ultra filtration membrane type SEPA-O, both of which are manufactured by Osmonics Inc., or of any other similar type.

A raw water inlet fitting 27 is threaded through the top end cap 19 and the upper end of the casing 18. A drain fitting 28 is threaded through the sleeve 20 and the bottom end of the casing 18 and a permeate or filtered water fitting 29 is threaded centrally into the bottom of the bottom end fitting 21.

A hollow service fitting 30 is threaded centrally into the top of the top end cap 19 and is provided with a closure cap 31. The fitting 30 is provided with a series of apertures 32 located below the inner surface of the cap 19 and has a screen 33 at its lower end.

A cap 34 is fitted over the upwardly extending portion 35 of the hollow mandrel 25a. The fluid passes from the hollow fitting 30 into the void 36 within the casing 18 and above the top end of the filter membrane 25. A plug 37 fitted within the hollow fitting 30 immediately above the apertures 32 prevents air from being trapped above the apertures 32. The downwardly extending portion 38 of the hollow mandrel 25a fits into the center of the upwardly extending portion 24 of the bottom end fitting 21.

A quick water tap connector 39, shown in detail in FIG. 4, includes a top end fitting 40 for direct connection with a water tap 41, a raw water outlet connector 42, a drain connector 43 and a needle valve 44, the details of which are shown in FIG. 4a.

A hose connection 45 connects the raw water fitting 42 to the filter module 9; a hose connection 46 connects to drain fitting 43 on the tap connector 39; and a filtered water hose 47 from the fitting 29 on the bottom of the filter module 9 has its free end in one case leading to the sterilization tank 12, or in the other case leading to the vessel 48 to be filled with filtered water.

For compactness, all three hose connections 45, 46 and 47 are threaded through the sleeve 49 which, in turn, is secured to the inner face of the base 6 by the slips 50 when the apparatus is not in use. A clamp 51 located at one end of the sleeve 49 holds the sleeve tightly about the hose connections 45, 46 and 47.

A recess 52 at the top of the base member 6 and a matching recess 53 at the top edge of the cover 7 permits the cover to be closed on the base member when the hose connections 45, 46 and 47 are connected to the fittings 27, 28 and 29 on the filter module 9, as shown in FIGS. 1 and 2.

The filter unit 5 can be conveniently mounted on any convenient surface close to the raw water tap 41 by means of the slotted apertures 54 engaging with screw heads on a wall or the back of a cupboard door.

In the operation of the above described apparatus, the raw water tap connector 39 is removed from the sterilization tank 12 and its open end portion 40 is pressed onto the end of the water tap 41 in the manner shown in FIG. 1 using a special tap fitting which is supplied with the unit, and which is fitted to the end of the water tap in place of a standard aerator. The free end of the hose connection 47 is inserted into the vessel 48 which is to be filled with purified water. The raw water tap 41 is then opened to permit water to flow through the hose connection 45 into the void 36 at the top end of the filter unit 9. The raw water flows down and through the various layers of the membrane 25 and through the hollow mandrel 25a and its extension 38 and thence through the fitting 29 and hose connection 47 to the vessel 48. The soft rubber band 26 prevents the passage of raw water downwards between the casing 18 and the outer surface of the filter membrane 25.

Impurities picked up by the filter membrane 25 from the raw water are carried downwards and into the void between the lower end of the casing 18 and the upwardly extending portion 24 of the bottom end fitting 21 and are carried away through the drain fitting 28 and hose connection 46 back to the tap connector 39. The needle valve 44 is adjusted and the water carrying impurities are drained out through side holes in the top portion of the needle valve and a central hole 55 in the body of the needle valve. The needle valve is constructed in such a manner that it cannot be completely closed.

While the apparatus is in use, the needle valve 44 must be adjusted so that the flow through the drain hose connection 46 and the flow of filtered water through the hose connection 47 is approximately the same. The adjustment of the needle valve 44 will be necessary to compensate for different pressures and different flows from the raw water tap 41. The pressure of the raw water can vary from 5 to 100 lbs. per square inch.

When the apparatus is not in use, the tap connector 39 and the free end of the hose connection 47 are kept in the sterilization tank 12 which has been filled with a mixture of filtered water and a sterilizing fluid. In this manner, the connector 39 and the free end of the hose connection 47 are kept free of contamination and at the same time, air is kept from entering and passing through the hose connections in the interior of the filter unit 9 and drying out of the filter membrane is prevented.

The filter unit 9 has a large degree of self-cleaning when in use by the draining of contaminated water through the hose connection 47. In one embodiment additional cleaning of the filter unit 9 can be carried out by the use of at least three different cleaning substances which are fed into the top of the unit 9 after removal of the cap 31. A first substance is an acid to remove mineral salts from the filter membrane surfaces, the second substance is a special detergent to remove fatty substances, and the third is liquid chlorine or other bacteriological cleaning compound. When these substances are inserted through the top of the filter unit, they are dispersed evenly over the top of the filter membrane and are drained away through the drain hose connection 46.

The filter unit 9 is tested for efficiency by inserting an organic dye into the top of the unit. After the raw water is turned on and enters the top of the unit, it initially mixes with the dye. There is a continual flow of dyed water for some time passing through the drain hose connection 46 and through the opened needle valve 44. The pure water hose 47 and its discharge end, however, will be discharging clean purified water. The dye molecules when hydrolized are approximately ten times smaller than virus molecules and therefore when stopped by the membrane, indicate that the membrane is intact and performs normally. If it appears that the drain line and the filtered water line both continue to have dye passing through, then there is obviously a break in the filter membrane 25 and it will be necessary to replace the filter unit.

The above described self-contained apparatus will be most useful where relatively small quantities of pure water are required. The self-cleaning of the filter membrane, together with the means for preventing the entrance of air to the unit, ensures long working life and the avoidance of frequent replacement of the filter membrane. The simple additional means for cleaning and testing the unit ensures that the apparatus can be used and serviced by relatively inexperienced persons and is suitable for use in remote locations such as farms, camps and cottages and also on boats, etc.

The embodiments of the invention in which an exclusive property or privilege is claimed are defined as follows:

1. A water filtration apparatus for the separation of impurities from a water supply comprising a casing having a base member and a cover member hinged to said base member, a filtration module and a sterilization tank both mounted on said base member, a quick connector adapted for attachment to a raw water tap, the said connector having a raw water inlet and an outlet drain, and a valve controlling the flow of water through the said drain, a pair of hose connections, one hose connection leading from the raw water inlet of said connector to the top of the said filtration module and the other hose connection leading from the lower portion of the filtration unit to the outlet drain of the said connector, and a purified water hose connection leading from the bottom of the filtration unit, the free end thereof adapted to be directed to a purified water receiving vessel and/or to the said sterilization tank, the said sterilization tank adapted to be filled with filtered water and the said quick connector when not connected to a source of raw water is maintained under filtered water in said sterilization tank to thereby prevent the passage of air through the said hose connections to the said filtration unit and to prevent bacteria contamination.

2. A water filtration apparatus as set forth in claim 1 in which the said filtration module includes a casing, an osmosis membrane which is spirally wound about a hollow mandrel having a perforated surface, the said mandrel projecting upwards into a void within the said casing above the said membrane, and projecting downwards below the said membrane, and the said hose connection leading from the water outlet of the said quick connector discharges into the void above the said membrane, and the lower end of the said hollow mandrel connects with the hose connection delivering purified water from the apparatus.

3. A water filtration apparatus as set forth in claim 2 in which the said filtration module includes a sleeved service fitting inserted into the top of the casing of the unit, and a closure cap for said fitting, the said fitting having a series of apertures located within the said casing, and the upper end of the said mandrel has a cap sealing the end of the mandrel, the said latter cap adapted to disperse cleaning and testing compounds into the inside of the module, inserted through the said service fitting, over the upper exposed end of the said membrane when said unit is inoperative.

4. A water filtration apparatus as set forth in claim 1 in which the said base member is of molded construction having a recess on its inner facing surface within which the said filtration unit is seated and secured, and having a recess within which the said sterilization tank is seated.

5. A water filtration apparatus as set forth in claim 3 in which the said sleeved service fitting includes a plug located above the level of the apertures in the fitting, the said plug preventing air from being trapped above the apertures.

6. A water filtration apparatus as set forth in claim 4 in which the recess in which the sterilization tank is seated has a forwardly projecting shelf at the lower end thereof to support the said sterilization tank partly within and partly without the inner surface of the base member thus permitting access to the open top of the tank, and which locks the tank in place without any additional clamps.

7. A water filtration apparatus as set forth in claim 1 in which the said hose connections are threaded through a sleeve for at least a part of their length, and clips on the said base member secure the said sleeve and threaded portions of the hose connections in coiled arrangement on the surface of the said base member when the said connector is located under water within the said sterilization tank.

8. A water filtration apparatus as set forth in claim 1 in which the said base member and the said cover member have hinge blocks on opposite side edges permitting the cover to be hinged on one side or the other of the said base member.

9. A water filtration apparatus as set forth in claim 1 in which the said quick connector includes a valve controlling the flow of drain water from the said filtration module through and out of the quick connector.

10. A water filtration apparatus as set forth in claim 9 in which the said valve is a needle valve threaded into the said quick connector, the said needle valve having side holes in a top portion and one central hole connecting the drain inlet of the connector to atmosphere when the needle valve is in the open position, the said needle valve being constructed in such a manner that it cannot be completely closed.

11. A water filtration apparatus as set forth in claim 1 in which the said base member has a recess at its upper edge portion and the said cover member has a matching recess at its upper edge portion, and the said sleeved hose connections pass through the said matching recesses when the apparatus is operative and the cover member is closed on the said base member.

* * * * *